United States Patent

[11] 3,554,264

[72] Inventors: James L. Baird, Winchester; Leo J. Monty, Reading, Mass.
[21] Appl. No.: 736,997
[22] Filed: June 14, 1968
[45] Patented: Jan. 12, 1971
[73] Assignees: Artisan Industries Inc. Waltham, Mass. a corporation of Massachusetts;

[54] THIN-FILM EVAPORATOR HAVING IMPROVED APPARATUS FOR REMOVING VISCOUS MATERIAL
11 Claims, 5 Drawing Figs.

[52] U.S. Cl. ................................................. 159/6
[51] Int. Cl. ................................................. B01d 1/22,
[50] Field of Search ..................................... 159/6W, 6WH, 2E, 49; 203/89; 202/236;

[56] References Cited
UNITED STATES PATENTS

| | | | |
|---|---|---|---|
| 3,067,812 | 12/1962 | Latinen et al. | 159/6W |
| 3,211,209 | 10/1965 | Latinen et al. | 159/6W |
| 3,217,783 | 11/1965 | Rodenacker | 159/2E |
| 3,233,656 | 2/1966 | Rodenacker | 159/2E |
| 3,242,969 | 3/1966 | Kiguchi | 159/6W |
| 3,346,034 | 10/1967 | Donovan et al. | 159/6WH |
| 3,349,828 | 10/1967 | Monty | 159/6WH |
| 3,357,478 | 12/1967 | Donovan et al. | 159/6WH |
| 3,357,479 | 12/1967 | Baird et al. | 159/6WH |
| 3,447,583 | 6/1969 | Herman et al. | 159/6WH |

Primary Examiner—Norman Yudkoff
Assistant Examiner—J. Sofer
Attorneys—Richard P. Crowley, Philip G. Kiely and Richard L. Stevens.

ABSTRACT: A horizontally axised rotary thin-film-type evaporator for the processing of viscous material having within the product outlet of the evaporator an auger screw in combination with a screw pump. The auger screw removes viscous thixotropic material from the evaporator and transfers it to the screw pump which discharges the material.

PATENTED JAN 12 1971 3,554,264
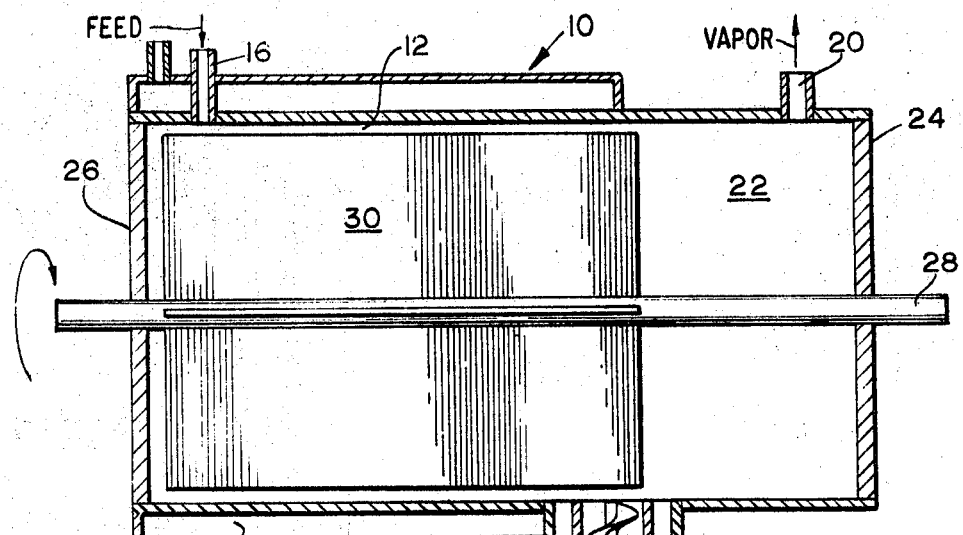
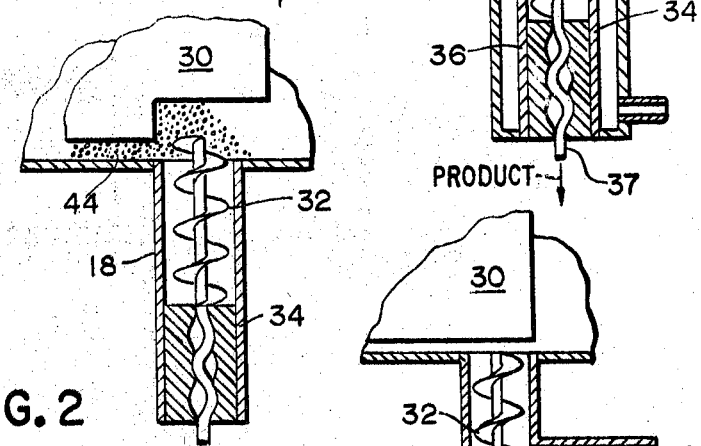
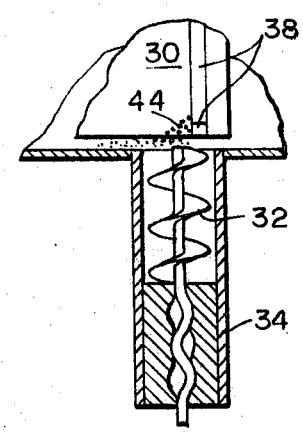
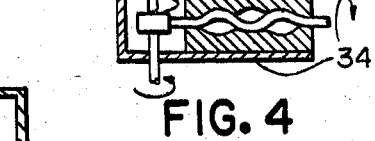
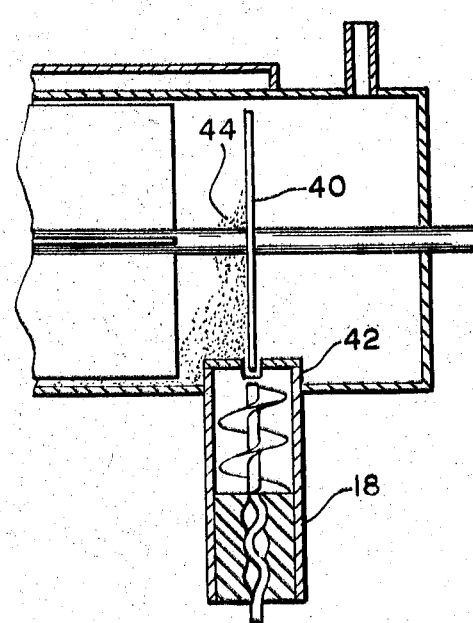
INVENTORS
JAMES L. BAIRD
LEO J. MONTY
BY
Crowley, Kiely & Stevens
ATTORNEYS

3,554,264

THIN-FILM EVAPORATOR HAVING IMPROVED APPARATUS FOR REMOVING VISCOUS MATERIAL

BACKGROUND OF THE INVENTION

In the processing, treating or handling of organic resins, polymers or solutions, it is often desirable to remove a solvent or liquid material from a resin, solution, emulsion, slurry, suspension or mixture. One means to accomplish the removal of a solvent or liquid material is through the use of thin-film technology. That is, a thin-film of the material to be concentrated is placed on the inner wall of a closed processing chamber to provide a surface for evaporation. Normally about this chamber is a heat exchange jacket to introduce heat into the thin-film thereby evaporating the solvent as desired. The thin-film is generally placed on the walls of the chamber by means of rotor blades or the like. The edges of which are spaced slightly apart from the interior wall of the chamber.

In the processing of materials in thin-film apparatus, the feed material to be concentrated is generally, introduced into one end of the evaporator and the product removed from the other end, and the vapor created by the evaporation of the solvent is withdrawn either from the product end of the evaporator or from the feed end depending upon whether the vapor flow is countercurrent or concurrent.

The material being processed generally forms a thin-film between the peripheral edges of the rotor blades and the interior wall of the chamber and as the material moves from the feed and/or upstream end of the evaporator and toward the product and/or downstream end of the evaporator the concentration of the material and therefore the viscosity increase. Also a thin fillet of material advances ahead of the leading edges of the rotor blades. When the fillet moves beyond the ends of the rotor blades it will flow downwardly by gravity. When this occurs, some of the material is caught in the vapor flow path and moves into the vapor chamber and some will fall and accumulate on the rotor shaft. With some materials in particular, the nonagitation increases the viscosity, and the flow of the material out the product outlet is inhibited. Accordingly, with viscous material it is preferable to keep it in an agitated condition and remove it prior to passing beyond the ends of the rotor blades.

In those horizontally axised thin-film-type apparatus such as an evaporator, materials which become very viscous during processing or upon discharge such as resins to be desolventized are extremely difficult to remove from the evaporator or processing section effectively. This is particularly true of non-Newtonian or thixotropic materials, that is, material which increase significantly in viscosity when in a nonfluid or nonagitated state.

As the materials are processed the agitation of the material is maintained by the action of the blades wiping the material on the chamber wall. However, when the viscous materials particularly the thixotropic materials approach and move into the product outlet of the evaporator they increase significantly in viscosity thereby making the removal of the materials from the evaporator difficult.

One method proposed to overcome this problem is to place an extruder for conveying viscous material from the chamber at substantially a right angle to the rotor axis thereby removing the viscous material accumulated on the cutout section of the rotor blades, (see for example U.S. Pat. No. 3,357,478). This arrangement is generally satisfactory for many product materials such as those having a viscosity of up to about 80,000 centipoise. However, for materials having viscosities over about 80,000 centipoise the action of the extruder screw may not be enough to keep them sufficiently agitated, until discharged.

Another method proposed to aid in the removal of viscous materials from thin-film evaporation apparatus is to place a ring just beyond the ends of the rotor blades at the product end to prevent viscous materials from traveling down the rotor shaft. A doctor blade or scoop removes the material accumulating about the outer peripheral edge of the ring and cuts it away into the product outlet, (see for example U.S. Pat. No. 3,357,479). However, often a problem still remains for the types of materials as described above to remove them rapidly and effectively from the product outlet after they have been doctored off the outer edge of the ring element.

SUMMARY OF THE INVENTION

We have discovered a new and improved method and apparatus for the removal of viscous material from thin-film evaporators. Our invention comprises a horizontally axised rotary thin-film evaporator having a feed inlet for the introduction of feed materials and an outlet for the removal of product materials. Rotor blades are secured to the rotor axis and are generally, radially, and coaxially arranged therefrom and extend into a close generally uniform relationship with the interior wall of the processing chamber. The downstream ends of the rotor blades may be just prior to or overlapping the product outlet.

Extending into or adjacent the processing chamber and located within the product outlet is an extruder screw such as an auger. The auger functions in combination with a positive displacement rotary-type pump such as a screw pump to aid in the rapid removal of the viscous material. The auger is adapted to transfer the material from the processing chamber and to the screw pump. That is, the auger maintains the product material in a continuous fluid or agitated condition thereby permitting its transfer and provides a head for the screw pump. This allows the screw pump to maintain a seal and move the material rapidly out of the evaporator product outlet. Also the auger in combination with the screw pump may be used in combination with vertical or inclined axised evaporators.

The rate of recovery of thixotropic materials, that is, rate of actual increase in viscosity after it is no longer in an agitated state will generally determine the location of the auger in the processing chamber. That is, it may be located directly adjacent to the peripheral edges of the rotor blades, slightly beyond the ends of the rotor blades or extend into the processing chamber. Further, the screw pump may be in line with the axis of the auger or it may be perpendicular thereto.

As described above, this invention is particularly applicable for the removal of viscous material having viscosities of over about 80,000 centipoise. Also it is particularly suited for the removal of thixotropic materials and obviously it includes but is not limited to removing all type of viscous materials such as pseudo plastic, Bingham plastics, dilatent plastics etc. and of course Newtonian materials which have a high viscosity. Viscosities in this range and thixotropic materials may often be found in the processing or organic resins or polymers wherein it is often desirable to remove a solvent or liquid material from a resin, solution, emulsion, slurry, suspension or mixture. However, it is particularly found useful in the processing of resinous or polmeric or elastomeric materials such as vinyl resins like vinyl short-chained fatty acids, etc., and vinylacetates such as polyvinylacetate and its resinous hydrolysis products.

BRIEF DESCRIPTION OF THE DRAWINGS

FIG. 1 is a schematic longitudinal section through a cylindrical, rotary wiped thin-film evaporator.

FIGS. 2, 3, 4 and 5 are alternative embodiments of our invention in sectional views.

DESCRIPTION OF THE PREFERRED EMBODIMENTS

FIG. 1 shows a horizontal axised, cylindrical-type evaporator 10, comprising a closed cylindrical chamber 12 having interior walls and surrounded on all or part of its length by a temperature control jacket 14, which is adapted for the introduction of a heating or cooling heat exchange fluid such as steam, cold water and the like. The chamber 12 is further characterized by a feed inlet 16 for the introduction by pump, gravity or vacuum of a feed material to be processed through the evaporator, a product outlet or discharge nozzle 18 at the opposite end thereof for the removal of the product material, and a vapor outlet 20, which vapor outlet extends into a vapor chamber 22 adjacent the product end of the evaporator 10. Closing heads 24 and 26 are secured to either end of the chamber 12 and support a horizontally inclined central-axised, tube-like rotor 28, which extends from the one end of the other of the chamber 12 through the vapor chamber 22. The rotor 28 is driven by a motor or other means (not shown) and generally extends outwardly from each end of the closing heads.

Extending axially outward from the rotor shaft are a plurality of generally four or more radial rotor blades 30 the blade tips of which extend into a small, but generally uniform, closely spaced relationship with respect to the interior walls of the chamber 12, so that upon rotation of the rotor shaft 28 the rotor blades 30 provide a thin, wiped or turbulent film of the processed material on the heated interior wall of the chamber 12.

Disposed within the product outlet 18 and extending upwardly toward the processing chamber 12 is an auger 32, adapted to transfer the material from the chamber 12. Disposed directly below the auger 32 and axially aligned therewith is a screw pump 34 which comprises a rotor 37 and a stator 36. The auger and the screw pump are driven by motors or other means (not shown). The auger 32 transfers and continuously agitates the viscous material from the chamber 12 to the screw pump 34. The screw pump 34 through the action of the rotor 37 moves the material out of the product outlet 18. The screw pump 34 and the auger 32 may be operated by the same drive means or each operated by a separate drive means. With separate drive means the auger and screw pump may be operated independently at different speeds. Also any positive displacement-type pump may be used such as a piston-type (radial or axial) or rotary-type (gear or vane) etc., all as described in the Encyclopedia of Chemical Process Equipment, William G. Mead, Rheinhold Publishing Corporation, New York, 1964, pages 775—788. About the product outlet 18 is a heat-exchange jacket 39 to control the temperature of the product material being removed.

In the operation of our evaporator a vinyl resin to be concentrated such as polyvinylacetate is introduced into the feed inlet 16 by gravity, under vacuum or pump while a relatively nonvolatile viscous product material is withdrawn through the product outlet 18, and the vaporized material withdrawn through the vapor outlet 20. Of course, if desired, other or additional vapor product outlets and feed inlets may be used. The rotor shaft 28 and the rotor blades 30 are rotated at high speed during the processing to form a thin-film of the feed material against the interior wall of the chamber 12 and a heat exchange fluid such as steam introduced into the temperature control jacket 14, whereby the thin-film on the interior wall is placed in a heat exchange relationship with the steam in the heating jacket to effect an evaporation of the relatively volatile component of the resin. As the polyvinylacetate is processed the vapor of more volatile material passes into the vapor chamber 22 and out the vapor outlet 20 and the viscous or product material is processed toward the product outlet 18. As the material moves toward the product outlet it is engaged by the auger 32 while in agitated thin-film form and moved from the processing chamber 12 down to the screw pump 34. This provides for continuous agitation of the product material to prevent or inhibit any increase in viscosity and further provides a head for the screw pump 34. Upon reaching the upstream end of the rotor 36 in the screw pump, the material is then displaced through the stator 38 and out the product outlet.

FIG. 2 shows an alternative embodiment of my invention wherein the rotor blades 30 extend over the product outlet are characterized by cutout segments therein. This provides thicker thin-film of material 44 at the discharge end and allows the auger 44 to extend into the rotor blade section. This embodiment is preferable where the material being processed has a fast rate of recovery. That is, the viscosity increase significantly in a short period of time when there is no agitation.

FIG. 3 is a further alternative embodiment of my invention wherein a continuous ring 38 is secured about the rotor blade edges such as described and shown in U.S. Pat. No. 3,349,828 which is hereby incorporated by reference in its entirety. This creates a greater build up of material 44 about the product outlet 18. However, if desired, instead of continuous ring 38, a wedge or similar projection may be used such as described in U.S. Pat. No. 3,348,600, to create an increased fillet of material adjacent the product outlet 18.

FIG. 4 is a further embodiment of my invention similar to that described and shown in FIG. 1 wherein the screw pump is at a right angle to the auger rather than in line therewith.

FIG. 5 shows the use of our invention in combination with the invention described and shown in U.S. Pat. No. 3,357,479, which is hereby incorporated by reference in its entirety. More specifically, affixed to the rotor shaft 28, beyond the ends of the rotor blades 30 and adjacent the product outlet 18 is a ring element 40 which is secured to and circumferentially surrounds and extends radially outward from the rotor shaft 38 to prevent or inhibit the flow of viscous materials down the rotor shaft. The ring 40 is generally spaced apart from the end of the rotor blades 30 by a predetermined amount, so that viscous material illustrated as material 44 accumulates behind it. The spacing may be varied as desired depending upon the material being processed, the speed of rotation and other factors. The ring element extends the proper radius to enable it to be an effective barrier in preventing the flow of viscous material down the shaft, but not so great to inhibit the vapor flow path between the closed processing chamber 12 and the vapor chamber 22.

An integral part of the product outlet 18 is a scoop or blade or conveying means 42 which projects toward the ring element 40 to "doctor off" or remove any excess viscous product material which during operation accumulated behind or in back of the ring element and attempts to move over the ring 40. The scoop 42 projects from the edge of the product outlet 18 within the processing chamber. The base of the scoop element is tube shaped and the outer wall of the tube shaped portion of the scoop element is flush with the inner wall of the product outlet 18. The upper portion of the scoop element is characterized by a cover or lid over the tube portion and which lid extends about halfway around the circumference of the tube portion. The lid rises up from the edge of the tube toward the center of the opening in the tube at an angle of about 15°. From the product outlet 18 the scoop 42 just reaches, but does not touch the edge of the ring element 40. The edge of the scoop 42 leads into the direction of rotation of the ring element, and as viscous material tends to build up or accumulate behind the ring element 40, it is doctored off or cut away by the leading sharp edge of the scoop 42. The viscous resin material which is cut away from behind the ring then falls or drops into the product outlet or discharge nozzle.

Within the product outlet 18 is the auger 38 and the screw pump 34. Materials removed from behind the ring 40 drops onto the auger and is removed from the evaporator with the product material.

It is obvious that any of the embodiments herein described and shown may be used in any combination thereof and that other obvious designs apparent to those skilled in the art are within the scope of this invention.

We claim:

1. An improved fluid processing apparatus of the rotary-wiped thin-film type which apparatus comprises in combination
   a. a substantially horizontally closed processing chamber characterized by an interior wall which defines a surface revolution;
   b. a rotor comprising a shaft within the chamber;
   c. means to rotate the rotor shaft;
   d. said rotor comprising blades secured to the rotor shaft for rotation therewith and extending from one end toward the other end of the processing chamber, the blades generally radially and coaxially arranged from the rotor and the wiping peripheral edges thereof extending into a close relationship with the interior wall of the chamber;

e. an inlet at the one end of the chamber for the introduction of a feed material to be processed;

f. a product outlet in the chamber axially spaced apart and downstream from the inlet for the removal of processed material from the chamber;

g. extruder means disposed within the product outlet and closely spaced to the peripheral wiping edges of the rotor blades at its upstream end and having a downstream end, said means adapted to convey viscous material from the processing chamber to the downstream end thereof and to provide a head whereby the material may be subsequently positively displaced;

h. positive displacement means to receive and displace positively the viscous materials discharged from the downstream end of the extruder means said displacing means being in continuous serial combination and material receiving relationship with the extruder means; and i. means to drive the extruder and the means to displace positively the material separately from the means to rotate the rotor shaft whereby viscous material from the processing chamber is continuously maintained in an agitated state and transported rapidly from the product outlet.

2. The apparatus of claim 1 wherein the product outlet is located adjacent and extends slight downstream of the ends of the rotor blades, and the extruder means and the means to displace positively the product material are located within the product outlet.

3. The apparatus of claim 1 wherein the rotor blades are characterized by a cutout segment therein at the peripheral wiping edges thereof and the extruder means extends through the product outlet and into a material receiving relationship with the cutout segments of the rotor blades.

4. The apparatus of claim 1 wherein at least one continuous narrow ring lies in a continuous plane transverse to the rotor axis and about the rotor blade wiping edges and secured thereto, arranged substantially flush with the rotor blade end edges and located downstream of the inlet orifice of the product outlet to direct the material back into the product outlet.

5. The apparatus of claim 1 which includes process material retaining means extending circumferentially about the rotor shaft and spaced downwardly from the downstream ends of the rotor blades and having a peripheral edge generally extending outwardly from the axis of the rotor shaft, said retaining means adapted to prevent the material clinging to the rotor from moving further down the rotor shaft during rotation; and a conveying means including a leading edge which is in a material receiving relationship with the retaining means and adapted to direct the material from the retaining means to the product outlet, whereby during operation the viscous material which clings to the rotor shaft and accumulates the upstream face of retaining means is continuously removed and directed to the extruder means. fluid 6. An improved fluid processing apparatus of the horizontally rotary-wiped thin-film type which apparatus comprises in combination:

a. a generally horizontally axised closed processing chamber characterized by an interior wall which defines a surface of revolution;

b. a rotor comprising a shaft within the chamber;

c. means to rotate the rotor shaft;

d. said rotor comprising blades secured to the rotor shaft for rotation therewith and extending from one end toward the other end of the processing chamber, the blades generally radially, and coaxially arranged from the rotor and the peripheral edges thereof extending into a close relationship with the interior wall of the chamber;

e. an inlet at the one end of the chamber for the introduction of a feed material to be processed;

f. a product outlet in the chamber axially spaced apart and downstream from the inlet for the removal of processed material from the chamber;

g. auger means disposed within the product outlet and closely space to the peripheral wiping edges of the rotor blades at its upstream end and having a downstream end, said auger means adapted to convey viscous material from the processing chamber to the downstream end thereof;

h. screw pump means to displace positively the product material which comprises a rotor and a stator and further wherein the auger and the rotor are juxtaposed and axially aligned; and i. means to drive the auger means and the screw pump means to displace positively the material, separately from the means to rotate the rotor shaft whereby viscous material from the processing chamber is continuously maintained in an agitated state and transported rapidly from the product outlet.

7. The apparatus of claim 6 wherein the axis of the auger means is generally perpendicular to the axis of the screw pump.

8. The apparatus of claim 6 wherein the product outlet is located at the downstream ends of the rotor blades and the screw pump comprises a rotor and a stator, the axis of the rotor being axially in line with the axis of the auger, and wherein a heat exchange jacket is about the product outlet whereby the material is rapidly and efficiently removed from the processing chamber.

9. The apparatus of claim 8 wherein the downstream ends of the rotor blades are characterized by a cutout segment therein and a continuous rings is secured to the peripheral edges of the rotor blades downstream of the product outlet.

10. The apparatus of claim 8 which includes process material retaining means extending circumferentially about the rotor shaft and spaced downwardly from the downstream end of the rotor blades and having a peripheral edge generally extending outwardly from the axis of the rotor shaft said retaining means adapted to prevent the material clinging to the rotor from moving further down the rotor shaft during rotation; and a conveying means including a leading edge which is in a material transfer relationship with the retaining means and adapted to direct the material from the retaining means to the product outlet, whereby during operation the viscous material clings to the rotor shaft and accumulates on the upstream face of the retaining means is continuously removed and directed to the extruder means.

11. An improved fluid processing apparatus of the horizontal rotary-wiped thin-film type which apparatus comprises in combination:

a. a generally horizontally axised, closed processing chamber characterized by an interior wall which defines a surface revolution;

b. a rotor comprising a shaft within the chamber;

c. means to rotate the rotor shaft;

d. said rotor comprising blades secured to the rotor shaft for rotation therewith and extending from one end toward the other end of the processing chamber, the blades generally, radially and coaxially arranged from the rotor and the peripheral wiping edges thereof extending into a close relationship with the interior wall of the chamber;

e. an inlet at the one end of the chamber for the introduction of a feed material to be processed;

f. a product outlet in the chamber axially spaced apart and downstream from the inlet for the removal of processed material from the chamber;

g. extruder means disposed within the product outlet and closely spaced to the peripheral edges of the rotor blades at its upstream end and having a downstream end, said means adapted to convey viscous material from the processing chamber to the downstream end thereof;

h. means to receive and displace positively the viscous materials discharged from the downstream end of the extruder means, said displacing means in serial combination and material receiving relationship with the extruder means;

i. means to drive the extruder and the means to displace positively the material, separately from the means to rotate the rotor shaft whereby viscous material from the processing chamber is continuously maintained in an agitated state and transported rapidly from the chamber and from the product outlet;

j. process material retaining means extending circumferentially about the rotor shaft and spaced downstream from the outlet end of the rotor blades and having a peripheral edge generally extending outwardly from the axis of the rotor shaft said retaining means adapted to prevent material clinging to the rotor shaft from moving further down the rotor shaft during rotation; and k. scoop means including a leading sharp edge which is in a material receiving relationship with the retaining means and adapted to direct the material from the retaining means through the product outlet whereby during operation the viscous material clinging to the rotor shaft and accumulating on the upstream face of the retaining means is continuously removed and directed to the extruder means.